Aug. 6, 1946.    W. J. ZENNER    2,405,173
PROJECTOR FOR PAGE PRINTERS
Filed July 17, 1940    7 Sheets-Sheet 1

INVENTOR.
WALTER J. ZENNER
BY
ATTORNEY.

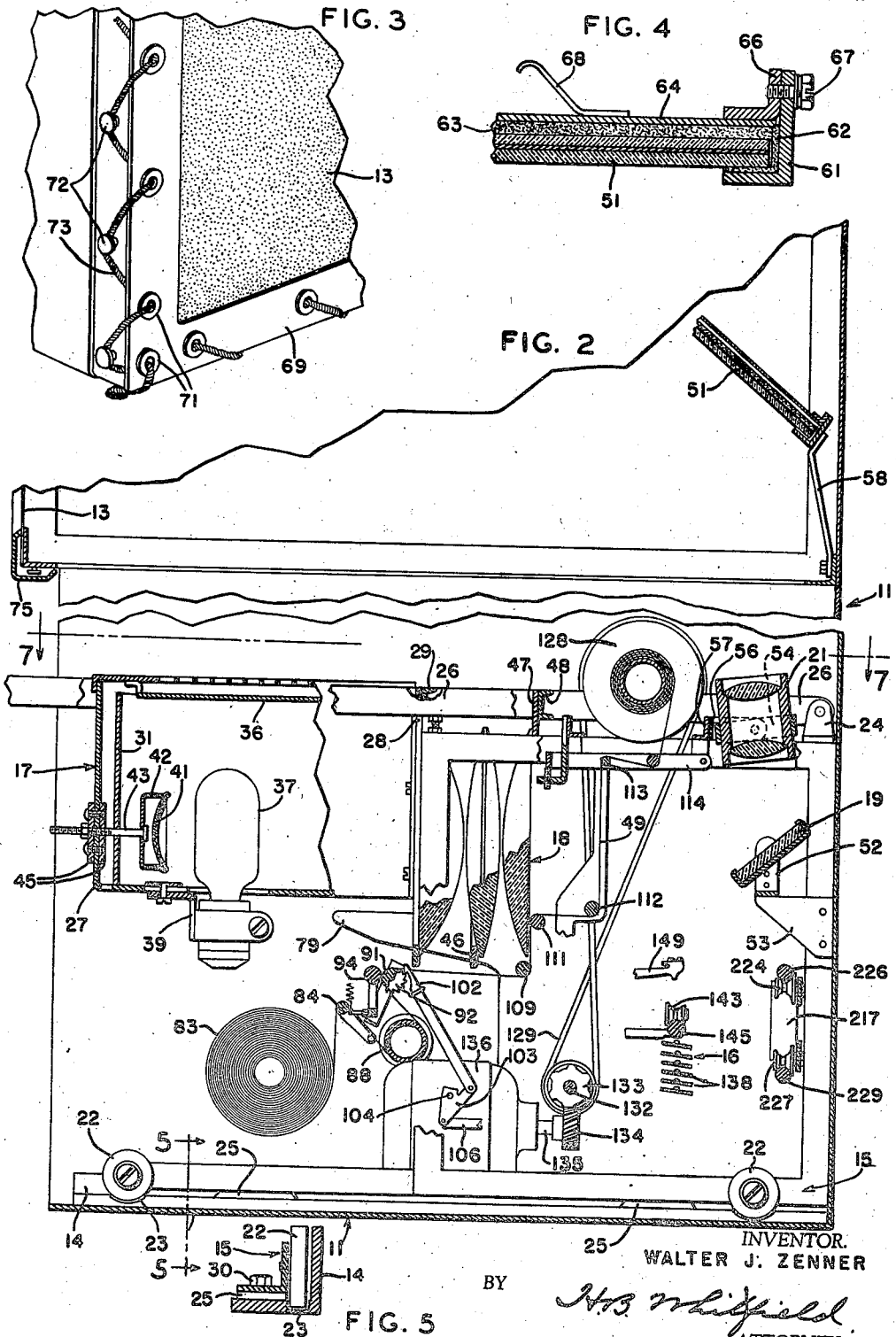

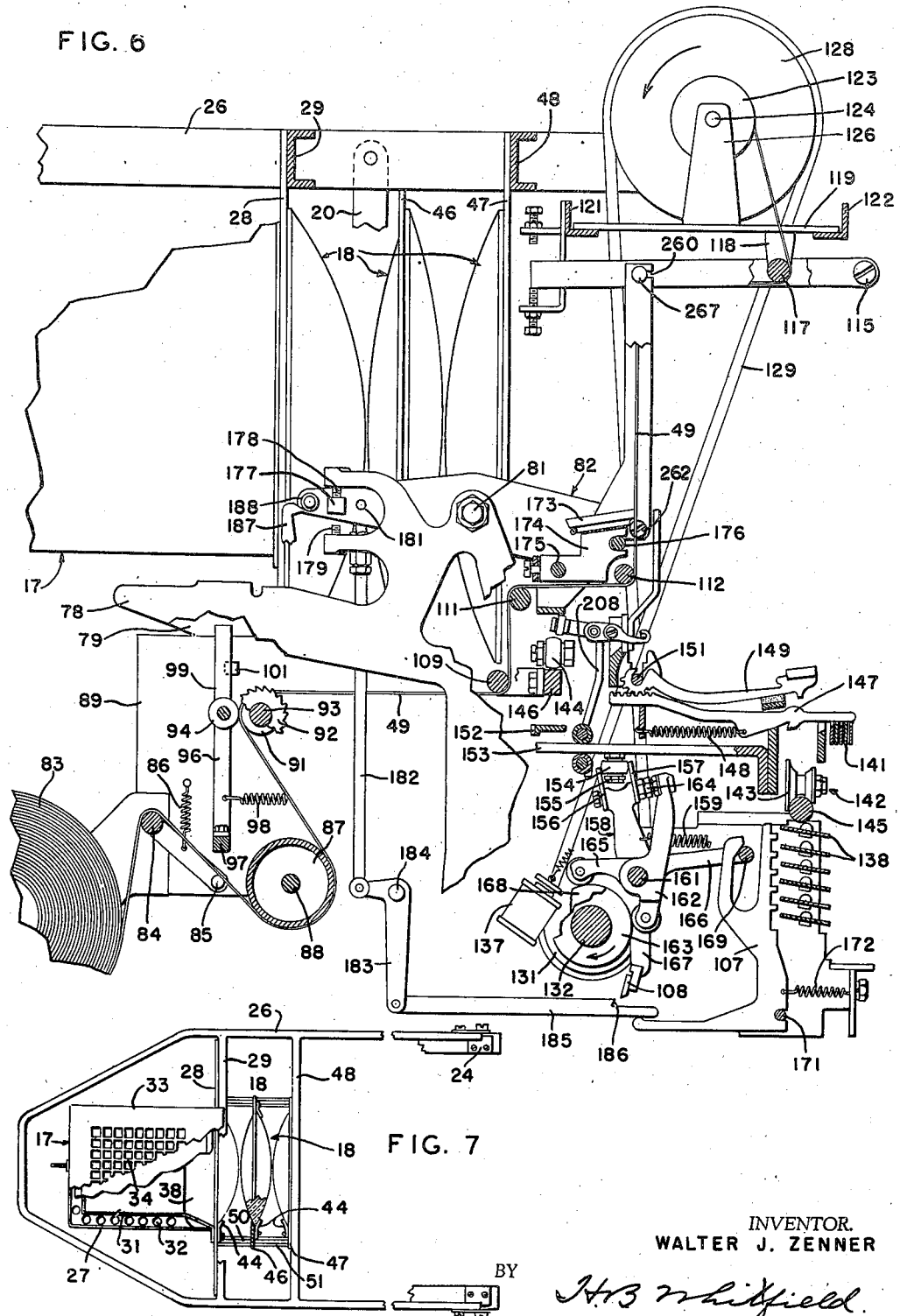

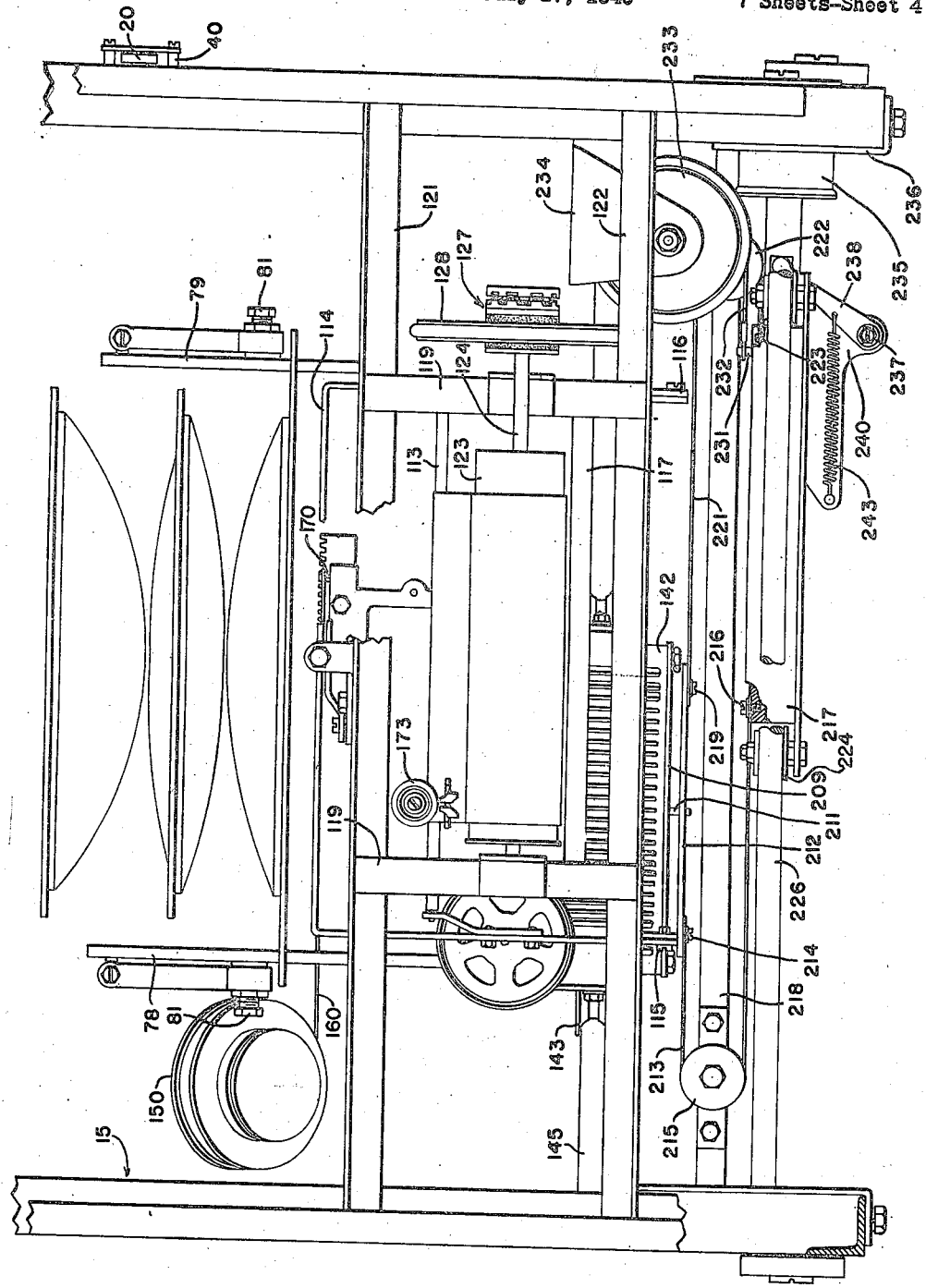

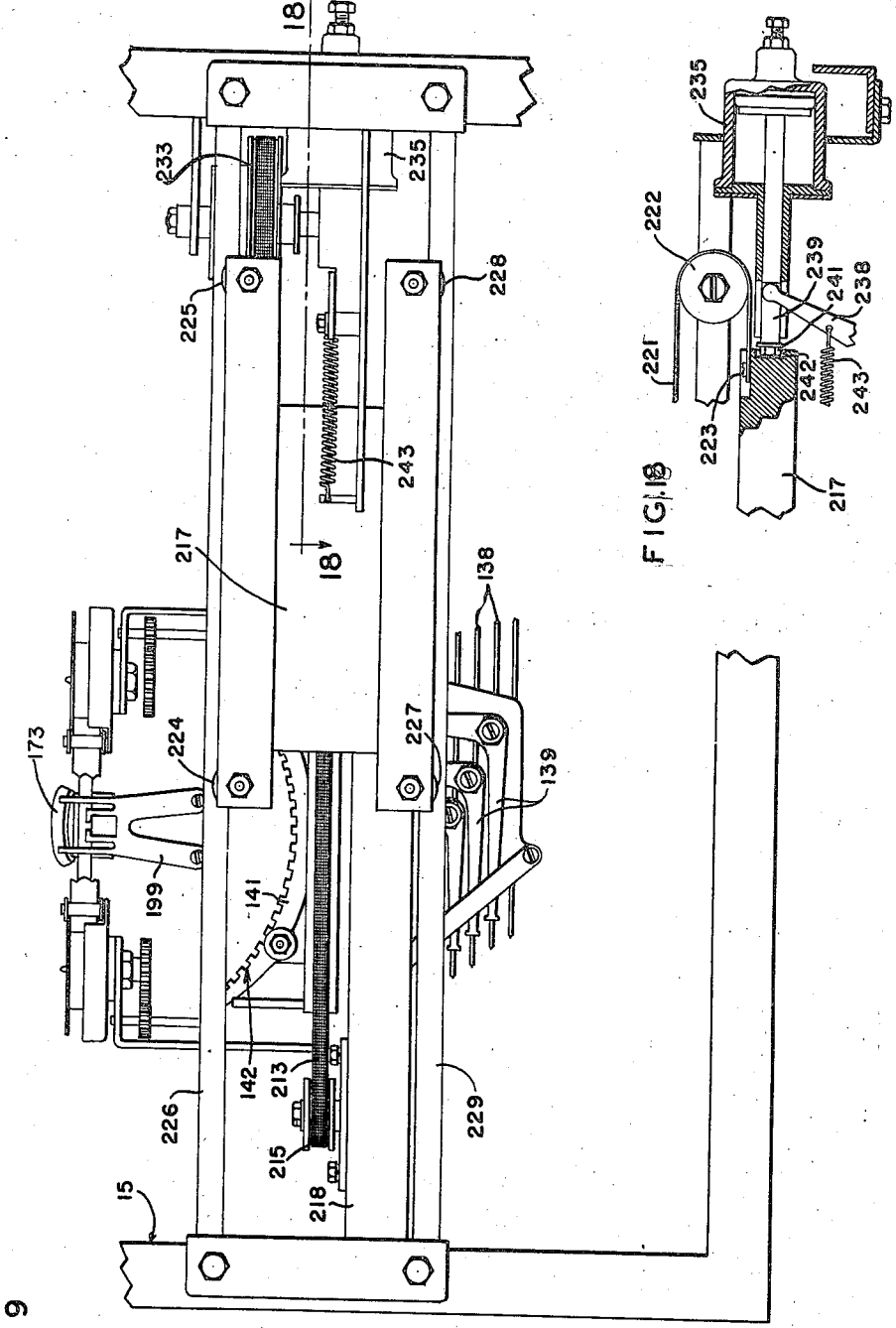

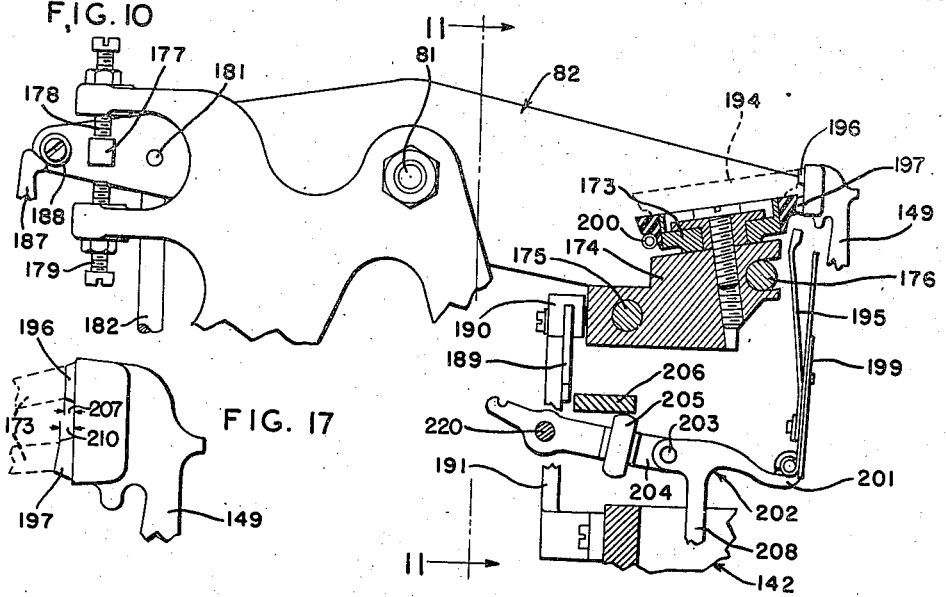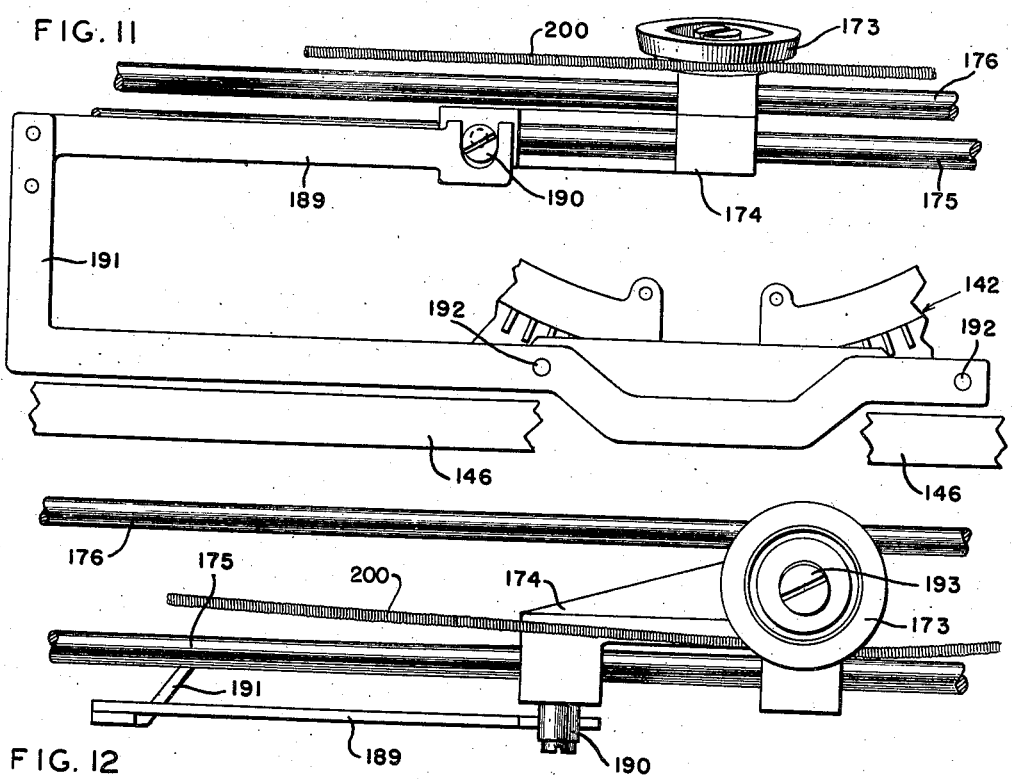

Aug. 6, 1946.  W. J. ZENNER  2,405,173
PROJECTOR FOR PAGE PRINTERS
Filed July 17, 1940  7 Sheets-Sheet 7

INVENTOR.
WALTER J. ZENNER
BY
ATTORNEY.

Patented Aug. 6, 1946

2,405,173

UNITED STATES PATENT OFFICE 2,405,173

PROJECTOR FOR PAGE PRINTERS

Walter J. Zenner, Des Plaines, Ill., assignor to Teletype Corporation, Chicago, Ill., a corporation of Delaware Application July 17, 1940, Serial No. 346,004

8 Claims. (Cl. 88—24)

The present invention pertains to printing telegraph projection systems and apparatus and more particularly to combination page printers and projectors for displaying on a screen or inspection area information in enlarged characters.

The primary object of the invention is to provide an efficient and reliable projection system for displaying on a screen telegraphically received message matter.

Another object of the invention is to provide a printer-projector in which the parts of the receiving printer are arranged and constructed to facilitate the projection and display of printed matter resulting from operation of a printing telegraph receiver.

According to the present invention a projection system has been provided which embodies a page printer, of the type shown in U. S. Patent No. 1,904,164, designed to give upon a screen a running account of received message matter, through the instrumentality of an optical system comprising an arrangement of inclined mirrors so that the printer and lamp housing may be located at the lower part of a suitable cabinet, and the screen formed as a part of the upper forward wall of the cabinet and positioned above the printer compartment.

Specifically, the page printer is mounted on rails supported in a structural frame to which is pivotally mounted the lamp housing, in such manner that the lamp housing with its condensing lenses is positionable so as to embrace within the field of projection the last line of printing, and also to include eight or ten printed lines. Printing is effected on a cellophane strip and the image of the record produced thereon is projected through the optical system onto the screen. The cellophane web or strip is drawn upwardly through the projection field. The characters on the section of the web in the projection field are so arranged as to form horizontal lines one above the other, and the images of said horizontal lines of characters are projected on the screen. The horizontal lines of images on the screen move upwardly across the screen similar to the movement of the web through the projection field.

The lamp housing together with the condensing lenses is swingable upwardly about its pivotal articulation with the structural frame to permit ready access to the page printer. The frame is movable on rails so that the entire structure including the printer and lamp housing may be rolled outwardly to permit withdrawal and thus render the apparatus carried by said frame accessible for servicing.

A feature of the arrangement according to the present invention resides in the means for case shifting the cellophane web in the projection field to control accurately the shifting movement of the printed record. Although the cellophane web is permitted to escape from the supply roll in a step-by-step manner, nevertheless said web is maintained taut between the web withdrawing or supply roller and the web take-up mechanism. The latter mechanism comprises a paper or web pulling device whereby the web is pulled past the printing point and through the projection field after the printing of a line.

Further features of the invention reside in providing a lamp housing having a baffle plate cooling means utilizing convection currents of air between the outer casing and the baffle plate; a disc platen movable with the type carriage wherein printing is effected on the periphery of the disc and the number of hidden printed characters is reduced to a minimum; and three-point mounting of the large or upper reflecting mirror to eliminate the possibility of injury to the mirror due to twisting action.

The foregoing and other objects and features of the invention will appear from the following detailed description taken in conjunction with the accompanying drawings, in which, Fig. 1 is a perspective view of the projection cabinet with a part of the wall broken away to show schematically the optical and projection system;

Fig. 2 is a cross-sectional view of the printer-projector according to the present invention;

Fig. 3 is a fragmentary perspective view showing the manner of attaching the screen to the cabinet;

Fig. 4 is a detail cross-sectional view of the large reflecting mirror;

Fig. 5 is an enlarged sectional view taken on line 5—5 of Fig. 2;

Fig. 6 is an enlarged side view and partial section of the printer mechanism and associated lamp housing and part of the optical arrangement;

Fig. 7 is a plan view of the lamp housing and lens support taken on line 7—7 of Fig. 2;

Fig. 8 is a plan view of the printer-projector apparatus;

Fig. 9 is an elevational view of the printer-projector apparatus;

Fig. 10 is an enlarged cross-sectional view of the printer platen and platen frame;

Fig. 11 is a view taken substantially on line 11—11 of Fig. 10;

Fig. 12 is a top view of the part of the printer mechanism shown in Figs. 10 and 11;

Fig. 17 is an enlarged side view of a type bar head; and

Fig. 18 is a sectional view taken on line 18—18 of Fig. 9.

Figure 1:
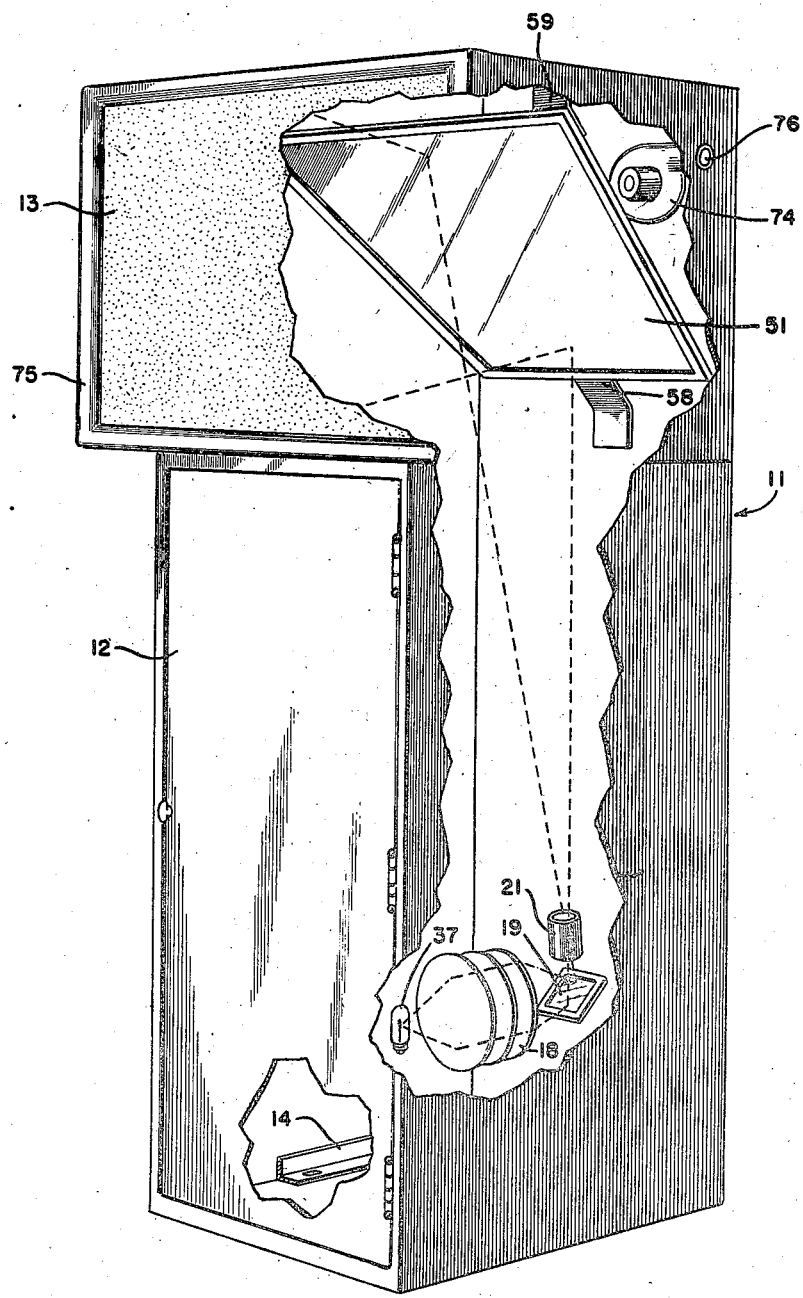

Having reference to the drawings in which like reference characters indicate similar parts throughout the several views, the combination page printing and projecting apparatus according to the present invention is housed in a cabinet, indicated generally by the numeral 11, which is provided in the lower portion thereof with a door 12, and in the upper portion with a translucent projector screen 13. Secured to the floor of cabinet 11 are two angle iron rails 14 (only one of which is shown in Fig. 1) which provide a track for the frame 15 (Fig. 2) which supports the page printing apparatus, indicated generally by the numeral 16, the lamp housing 17, and the optical arrangement represented generally by condensing lenses 18, small mirror 19 and objective lens 21. Wheels 22 are journaled to the bottom side members of the frame 15 and co-operate in rolling relation with rails 14, which are provided with indentations 23 into which the wheels 22 are admitted when the frame 15, in assuming its fully inserted position in the cabinet 11, rests upon spacing bosses 25. In the fully inserted position, the frame 15 is anchored by means of bolts 30 to the base of the cabinet 11. With this arrangement, the frame is easily insertable in the cabinet 11 by means of rollers 22, and moreover is adapted, when the proper position has been assumed, to rest upon bosses 25 and then to be anchored to the cabinet 11 by the bolts 30 (Figs. 2 and 5).

At each side of frame 15 and disposed at the rear thereof are pivot supports 24 for a U-shaped frame 26 (Fig. 7) which carries the lamp housing 17 and condenser lenses 18. A bar 20 (Fig. 6) is pivoted to frame 26 and the lower end of said bar is provided with a hook portion (not shown) by which, when the frame 26 is swung upwardly about pivots 24 to facilitate removal of the printer for servicing, the bar is held in its upward position by the engagement of said hooked portion with a spacer stud 40 (Fig. 8), in a well-known manner, the bar 20 thus serving as a brace or support. The lamp housing 17 comprises an outer casing 27 (Figs. 2 and 7) which is secured to a plate 28 fastened to a crossbar 29 of the frame 26. Contained within the lamp housing 17 and suitably spaced from the outer casing 27 thereof is a baffle plate 31 which rests upon the bottom of the housing 17 and extends upwardly to a point close to the top, as illustrated in Fig. 2. The bottom of the housing 17 is provided, between the outer casing 27 and the baffle plate 31, with apertures 32. This construction permits the flow of convection currents between the outer casing 27 and the baffle plate 31 for cooling purposes. Housing 17 is provided with a cover 33 having a grilled section 34 covered by a meshing if desired. Depending from the cover 33 and spaced therefrom is a baffle plate 36 (Fig. 2) of substantially the same area as the opening 34. To protect the condensing lenses 18 from the heat of lamp 37, the bottom of the housing 17 may be cut away as at 38. Lamp 37 is adjustably clamped to a bracket 39, which in turn is adjustably supported by the floor of the housing 17. A reflector 41 is spring clamped by a carrier 42 which is adjustably supported, through the instrumentality of a rod 43 and the enlarged mounting holes for plates 45, by the outer casing 27 of the lamp housing 17.

In the embodiment of the invention shown in the drawings, a condensing lens system 18, comprising two plano-convex lenses and one convexo-convex lens, is provided, these lenses being suitably clamped by clamps 44 (Fig. 7) to plates 28, 46 and 47 which are appropriately separated by spacing posts 50 and 51. Plate 47 is secured along its top edge to a crossbar 48 (Fig. 2) of frame 26. Plates 28, 46 and 47 are suitably apertured to provide a field of projection of such area as to present upon the screen 13 (Fig. 1) a predetermined number of lines of printing produced on the record strip or web 49 of transparent material.

As previously mentioned, the optical system of the present invention includes a mirror 19 and an objective lens 21. The optical system also includes a mirror 51 (Fig. 1) supported in the upper part of the cabinet 11, and through this system the image is projected upon the screen 13. The mirror 19 is adjustably pivoted on a pair of standards 52 by means of which its angular position may be determined. Moreover, standards 52 are adjustably mounted on brackets 53 secured to frame 15. The objective lens 21 is adapted to be adjustably clamped by a clamping band 54 which is supported on a U-shaped bracket 56, which in turn is secured to a crossbar 57 on frame 15. Thus, the adjustable mountings provided for the mirror 19 and the objective lens 21 facilitate the proper positionment of the image on the screen.

Mirror 51 is supported at three points to minimize, or even eliminate the possibility of injury to the mirror due to a twisting action. Mirror 51 is secured to the cabinet 11 through the instrumentality of a bracket 58 located centrally of the bottom edge of the mirror. At each of the upper corners of mirror 51 is provided a bracket 59 by means of which the mirror is secured to the roof of cabinet 11. Mirror 51 is in the form of a regular trapezoid, with the shorter of the parallel sides positioned contiguous to bracket 58. The trapezoidal shape of the mirror 51 conforms to the effective shape of the field of projection at the angle at which mirror 51 is placed in cabinet 11. Mirror 51, so shaped, produces a rectangular visual field or field of projection on screen 13, which accordingly is of rectangular conformation.

Mirror 51 is mounted in a shock-proof frame substantially as shown in Fig. 4. In the present embodiment, the mirror frame comprises angle iron sides 61 suitably secured at the corners of the frame, and the mirror 51 is laid in this frame upon felt strips 62 interposed between the mirror and the angle iron. A layer of mastic (or other nonhardening) cement 63, which has the properties of adhesiveness, is spread evenly over the mirror 51 upon which is laid a metal backing plate 64. The felt strip 62, mirror 51, mastic cement 63, and metal plate 64 are appropriately clamped together by means of strips of angularly shaped clamps 66 secured by screws 67 to frame 61. Mirror 51 is a built-up assembly of shatter-proof glass, the mirrored surface being located between the two layers of glass. The metal backing plate 64 may be further reinforced by reinforcing strips 68.

The projection screen 13 is composed of translucent material so as to permit an image to be projected on to it from the rear and be visible from the front of the screen. In the present form of the invention the screen 13 is provided with a stout binding 69 having eyelets 71 therein. The cabinet 11 is provided with a series of studs or buttons 72 properly spaced around the edge of the opening to be covered by screen 13. The screen 13 is then fastened to the cabinet 11 by means of a lacing 73 which passes alternately through eyelets 71 and studs 72, and in this manner the screen is drawn tightly and evenly across the opening provided therefor. A corner strip 75 is provided around the edge of the screen 13 to protect the lacing connection between the screen and the cabinet.

A blower or exhaust fan 74 (Fig. 1) is located at the upper part of the cabinet 11 and is positioned behind the mirror 51. Blower 74 is so mounted that its exhaust port projects through an aperture 76 in cabinet 11, and is suitably supported in said cabinet.

Having reference to Fig. 2, a page printer of the type shown in U. S. Patent 1,904,164 is mounted in the frame 15. The printer, indicated generally as 16, has been modified in certain respects to adapt it for use with the projector of the present invention. The page printer comprises the side frames 78 and 79 (Fig. 6) to which is pivoted at 81 a platen frame, indicated generally as 82. The usual cylindrical form of platen has been dispensed with in the present embodiment of the invention and has been substituted by the disc form of platen 173 shown in Figs. 10, 11 and 12, and which will be hereinafter described.

To provide a running account of the message printed on the page material, a delivery mechanism is provided which comprises a means for permitting the record material to escape from the supply roll, suitable guides, and a web pulling means whereby the page material is advanced through the printing zone. The page material 49 in being delivered from the roll 83 is directed over a slack bar 84 which is pivoted at 85 and is normally biased clockwise by a spring 86 to maintain the page material or Cellophane web taut between the roll 83 and a flanged cylindrical guide 87 carried on a shaft 88 journaled in plates 89 depending from side frames 78 and 79. The web 49 is then directed over a roller 91 to which is fixed a ratchet wheel 92, the ratchet wheel and roller being carried on a shaft 93 journaled in the plates 89 secured to side frames 78 and 79. Co-operating with the roller 91 is a pressure roller 94 which is carried on a standard 96 secured to a rock shaft 97. Pressure roller 94 is drawn into pressing relation with roller 91 by means of a spring 98. Secured to rock shaft 97 and located in juxtaposition to plate 89 is a pressure roller release lever 99. Co-operating with lever 99 is a shoulder 101 on plate 89 arranged so that when lever 99 is actuated counterclockwise (as viewed in Fig. 6) against the action of spring 98 it will latch-up behind or on the left-hand side of the shoulder 101, thereby releasing the pressure roller 94 from engagement with pressure roller 91 and maintaining this condition until lever 99 is again released from the shoulder 101 to permit spring 98 to bring roller 94 again into pressing relation with roller 91. Associated with the ratchet wheel 92 is a pawl member 102 (Fig. 2) which is pivoted to a bell crank lever 103 carried on a pivot shaft 104. The depending arm of bell crank 103 is pivoted to one end of a push rod 106, the other end of which is shouldered to co-operate with a function bail 108 in the manner shown in the aforementioned Patent 1,904,164. Thus, in response to a predetermined selection a function lever, similar to function lever 107 shown in Fig. 6, is selected to raise the free end of push bar 106 upwardly into the path of the function bail blade 108. Then, when the push rod 106 is actuated leftwardly by the function bail 108, clockwise rotation is imparted to bell crank lever 103 to impart in turn, downward movement to pawl 102. In this manner, the ratchet wheel 92 is rotated clockwise one step, which, through the co-operation of pressure rollers 91 and 94, acts in co-operation with a web pulling device to deliver a predetermined amount of record material 49 from the supply roll 83 to the printing zone and the projection area.

The record material 49 is brought to the printing position by means of a pulling or drawing mechanism now to be described. The record material 49 as it leaves roller 91 is directed around guide rods 109, 111 and 112. These guide rods may take the form of fixed rods, carrying guide rollers thereon to eliminate friction. From the guide rod 112 the record material 49 is directed vertically through the printing zone and projection field to a guide rod 113 carried by a U-shaped shifting frame member 114 (Figs. 2, 6, 8 and 13) pivotally carried on pivots 115 and 116 (Fig. 8) suitably journaled in the frame 15. The page material 49 is then directed around a guide rod 117 carried in supports 118 (Fig. 6) depending from bars 119 secured to angle iron crossbars 121 and 122 of frame 15. From thence, the page material 49 is directed around a spindle 123 fixed to a shaft 124 journaled in standards 126 supported on said bars 119.

Shaft 124 is interconnected through a friction clutch 127 (Fig. 8) to a pulley 128. Continuous counterclockwise rotation (as viewed in Fig. 6) is imparted to pulley 128 through the instrumentality of a belt 129 connected to a pulley 131 fixed to the main operating shaft 132 of the page printing apparatus shown in Patent 1,904,164. Shaft 132 carries a gear 133 which meshes with a pinion gear 134 fixed to shaft 135 of a motor 136 (Fig. 2). Motor 136, therefore, through gears 134 and 133, shaft 132, pulley 131, and belt 129 imparts continuous rotation to pulley 128 which through the friction clutch 127 imparts a constant torque through shaft 124 to the spindle 123. With this arrangement the page material 49 is maintained in a taut condition between the spindle 123 and the roller 91. Thus, when the ratchet 92 is rotated one step a predetermined amount of the page material 49 is delivered from the supply roller 83, which material is immediately taken up by the spindle 123 to preserve the taut condition of the page material.

As disclosed in the aforementioned Patent 1,904,164, the page printer 16 is controlled telegraphically by a selector magnet 137. This is connected in a signal line (not shown) on which are impressed code combinations of signaling impulses. The code signals control, through the selector magnet 137 of a sword and T-type selector (not shown here, but illustrated and described in said patent) a series of selector vanes 138, which in turn controls through bell cranks 139 (Fig. 9) a set of curved code bars 141 (Figs. 6 and 9). Code bars 141 and bell cranks 139 are supported on a movable type carriage, indicated generally by the numeral 142, which is provided with rollers 143 and 144 whereby it is adapted to travel on tracks 145 and 146, respectively, positioned between side frames 78 and 79. Co-operating with code bars 141 are a plurality of pull bars 147 having individual springs 148. Pull bars 147 are operatively connected by rack and pinion connections to a corresponding plurality of type bars 149 pivoted on a shaft 151.

Type carriage 142 is also provided with a spacing rack 152 which co-operates with a spacing mechanism (not shown) similar to that illustrated in Patent 1,904,164, to control the movement of type carriage 142 to form character spaces, tending in this movement to wind up a carriage return spring mechanism, indicated generally in Fig. 8 as 150, the strap 160 of which is secured to stud 170 fastened to type carriage 142. Upon receipt of the carriage return signal, a function lever (similar to lever 107) is selected and the carriage return mechanism actuated in the manner described in the aforementioned Patent 1,904,164. Carriage return mechanism 150 is thereupon permitted, due to the energy stored therein, to return the type carriage 142 to its normal or beginning-of-line position.

A pull bar bail 153 is mounted in the type carriage 142 and is provided with a roller 154 carried on the bottom side thereof on a stud 155. Roller 154 operates between a pair of blades 156 and 157 of a main printing bail 158 so that bail 153 can be reciprocated by bail 158 in any character spacing position of the type carriage 142. Fastened to the printing bail 158 is one end of a printing spring 159, the other end of which is connected to a printing blow adjustment means as shown in Patent 1,904,164. Bail 158 is mounted on a shaft 161 on which is also carried a printing bail actuator 162 which co-operates with a printing cam 163. Actuator 162 carries at the end of its upper arm a stud 164 which has abutting relation only with printing bail 158 and is not permanently connected thereto, which is to permit spring printing. Printing bail 158 is also provided with a pair of arms 166 which carry a function lever bail 169. Also carried on shaft 161 is a function bail comprising arms 165 and 167. Arm 165 is provided with a follower roller 167. which co-operates with a function bail cam 168, and arm 167 supports on its end the function bail blade 108.

Associated with the selector vanes 138 are a plurality of function levers 107 mounted on pivot rod 171 and provided with individual springs 172 which tend to rotate the function levers clockwise into registry with the selector vanes 138. The function levers 107 are normally held out of engagement with the selector vanes 138 by means of the rod 169 of the function lever bail.

As previously mentioned, the platen frame 82 is pivotally supported on pivots 81 in side frames 78 and 79. The platen comprises a circular disc 173 (Figs. 6, 9, 10, 11 and 12) rotatably mounted on a carriage 174 which is slidable on rods 175 and 176 carried by platen frame 82. Platen carriage 174 is connected to the type carriage, as will be presently described, so as to be movable therewith, the effective printing edge of the platen 173 being located coincident with the printing point or zone determined by the path of operation of the type bar 149.

The platen frame 82 is adapted to be rocked from the "letters" or unshift position to the "figures" or shift position in the manner fully set forth in the aforementioned Patent 1,904,164. Briefly, the side frame of the platen frame 82 (as shown in Fig. 6) is provided with a lug 177 which operates between two adjustable stops 178 and 179. Adjacent to lug 177 there is pivoted to the side frame of the platen frame 82 on pivot 181, the upper end of a link 182, the lower end of which is pivoted to the horizontal arm of a bell crank lever 183 pivotally mounted at 184. To the lower end of the depending arm of bell crank 183 is pivoted push bar 185, the free end of which overlies a leftwardly directed arm of the function lever 107. Push bar 185 is also provided with a shoulder 186 which co-operates with the function bail blade 108. The platen frame 82 and platen 173 are shown in Figs. 6 and 10 in the "letters" or unshift position, with the stop lug 177 against the upper stop screw 178. This condition is achieved when the function bail blade 108 has operated upon the shoulder 186 to move the push bar 185 leftwardly to rotate the bell crank 183 clockwise, thus raising the link 182 to cause the platen frame 82 to rock clockwise.

A correspondingly similar construction is provided for the figures or shift mechanism. That is, a shift function lever similar to lever 107 is provided which when selected is caused to rotate clockwise to bring its rearwardly extending arm into operation to raise a push bar, similar to bar 185, into the path of the function bail blade 108 which, when it is permitted to operate leftwardly (as viewed in Fig. 6) will cause a bell crank, similar to bell crank 183, to pull down a link similar to 182 to rock the platen frame 82 counterclockwise to bring its stop 177 against the lower stop screw 179. The platen frame 82 is maintained in its shift or unshift position by a spring actuated detent member 187 acting on a detent roller 188.

An arrangement is provided, according to the present invention, for accurately controlling and accelerating the shifting movement of the portion of the record material which is in the field of projection, in response to corresponding movement of the platen between the upper and lower case shift positions. Accelerating the web shift minimizes the optical effect upon the image. As previously alluded to, the U-shaped shifting frame member 114, which is pivotally supported at 115 and 116 in the frame 15, carries a guide rod 113 for the record strip 49 which co-operates with guide rod 112 to guide the record material through the field of projection. Frame member 114 is operable between adjustable stops 244 and 245 mounted on arms 246 and 247, respectively, of bracket 248 fixed to the cross bar 121 (Figs. 6 and 13).

Mounted on bracket 248 are elements comprising an overcentering device which co-operate with the shift frame 82 to effectuate the control of the record strip in the projection field. The overcentering device comprises a lever arm 249 pivoted at 251 to bracket 248, and is articulated to the member 114 at 252. Lever 249 terminates in a forked end 253 in which a stud 254 is slidably operable. Stud 254 is mounted on the end of a lever arm 255 pivoted at 256 to bracket 248. A spring 257 is extended between stud 254 and a spring post 258 carried on bracket 248. Spring post 258 and pivots 251 and 256 are arranged on a common center line substantially intermediate the stops 244 and 245 so that bar 114, after passing over center above or below said line, will be urged by spring 257 against stops 244 or 245, respectively.

Figure 13:
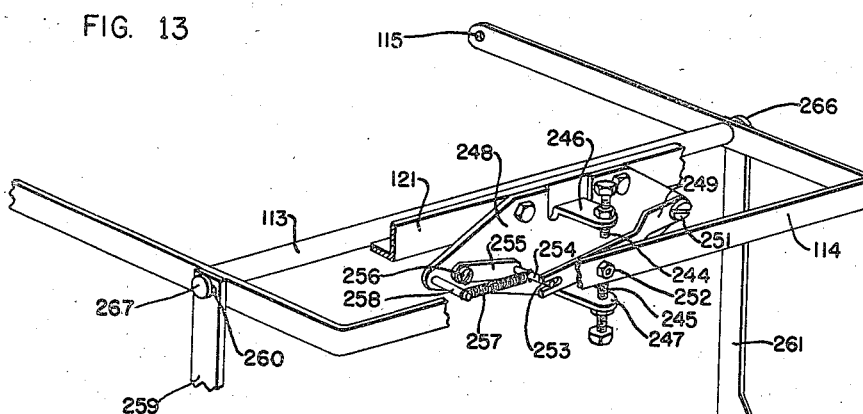
Fig. 13 is a perspective view of the shift control mechanism for the projection field.
Figure 14:
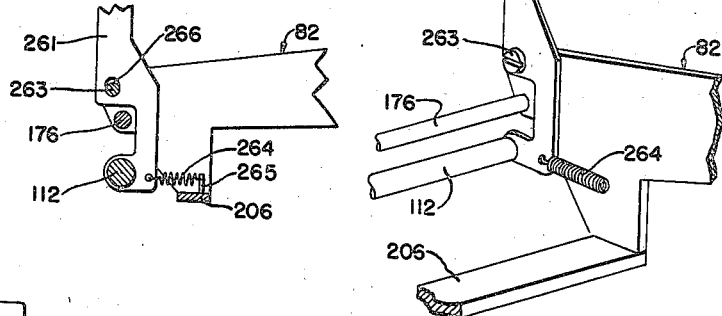
Fig. 14 is an enlarged cross-sectional view of the connection between the platen frame and the shift control mechanism for the projection field.

Member 114 is connected to the platen frame 82 by means of a pair of lever members 259 and 261 which are pivoted to frame 82 at 262 and 263, respectively (Figs. 6 and 13). Members 259 and 261 are each provided at the upper end thereof with an open-ended slot 260 which fits over the shank of a headed stud 267 and 266, respectively. With this arrangement, the members 259 and 261 may be easily disconnected from studs 265 and 266 so as to render the printer readily detachable from the frame 15. Supported by the depending arms of the levers 259 and 261 is the previously mentioned guide rod 112. Levers 259 and 261 are normally urged in a counterclockwise direction (as viewed in Fig. 13) about their respective pivots 262 and 263 by individual springs 264 anchored to spring posts 265 fixed to rail 206 of the platen frame 82 (Fig. 14).

Having reference to Figs. 6 and 13, the frame 114 is illustrated as movable with platen frame 82. To assure a definite extent of movement of frame 114, the stops 244 and 245 are provided. The platen frame 82 is shiftable between stops 178 and 179 by the spring action of detent 187 which is in the nature of an overcentering means because, as link 182 acts to rock the platen frame 82 between the two shift positions, the camming action of detent 187 operates to assist and hasten the shifting movement. The action of the overcentering device mounted on bracket 248 is comparable, and to permit this assisting action, the hole 266 (Fig. 14) in each of the levers 259 and 261 is elongated so that the overcentering action takes effect immediately upon passing over center independently of the entire movement of platen frame 82, and urges frame 114 into proper position against one or the other of the adjustable stops 244 or 245. In other words, the platen frame 82 begins the movement of the frame 114, and the overcentering device completes this movement suddenly upon passing over center, the elongated holes 266 permitting the overcentering device to take the control of the frame 114 from the platen frame 82.

In Figs. 10, 11 and 12 is illustrated the manner in which the platen carriage 174 is connected to the type carriage 142 so as to be movable therewith. As previously mentioned, the platen carriage 174 is slidably supported on rods 175 and 176. Carriage 174 is provided with an eccentric stud engaged by the forked end of a bar 189, the left end of which (as viewed in Fig. 11) is secured to a member 191 which is secured by screws 192 to the type carriage 142. As viewed in Fig. 12, the circular platen 173 is rotatably mounted on the platen carriage 174 by means of an eccentric screw means 193. By means of the adjustment 193 the platen 173 is adjustable toward and away from the record material to vary the clearance therebetween. Rightward and leftward adjustment, as viewed in Figs. 11 and 12, is also provided for the platen 173, through the instrumentality of the eccentric adjusting means 190.

An important feature of the present invention is the provision of a platen so positioned as to reduce to a minimum the obstruction of the projected image by the platen. To achieve this result the platen 173 is tilted, with respect to the record material printed upon, sufficiently to clear the light cone. The peripheral surface of the platen 173, upon which printing is effected, is slightly beveled so that in one of the shift positions of the platen the peripheral surface of the platen will be parallel to the record material. In the present embodiment the peripheral surface of the platen 173 is parallel to the record strip when the platen frame 82 has been shifted to the upper case position as indicated in Fig. 10 by the dotted line 194 of the platen 173.

To compensate for this arrangement of the platen 173, the type faces on the type bar 149 are arranged as shown in Fig. 17. Moreover, this arrangement of type faces in co-operation with a shield 195 (Fig. 10) serves (as will presently appear) to prevent smudging during the printing operation. As is well known, the type bar 149 is provided with an upper case type face 196 and a lower case type face 197 (Fig. 17). However, according to the present invention the lower case type face 197 is provided with a slope corresponding to the slope of the periphery of the platen 173 when in the lower case position. The dimension 207 of the upper case type 196 is arranged to be slightly less than the minimum height 210 of the lower case type 197. When printing is effected in the lower case position, the type face 196, being lower than the type face 197, will not touch the record material and hence no smudging of the printed record will occur.

When printing is effected in the upper case position, means is provided for preventing the lower case type face 197 from coming into direct contact with the surface of the record material. To achieve this result a shield 195 is provided which is adapted to be interposed between the type face 197 and the platen 173 when printing is being effected in the upper case position. Shield 195 is secured to the ribbon oscillating member 199, which, as described in the aforementioned Patent 1,904,164, oscillates the inking ribbon into and out of the path of the type faces during the printing operation. The ribbon oscillator 199 is pivotally articulated to arm 201 of a lever 202 which in turn is pivoted at 203 to a lever 204 pivoted at 220 to the type carriage 142. Lever 204 is arranged to carry a roller 205 which rides on the bottom side of a rail 206 mounted on the platen frame 82, as disclosed in the aforementioned Patent 1,904,164. Roller 205 is pressed against the rail 206 by a spring (not shown), so that when the platen frame 82 is rocked between the shift and unshift positions, roller 205 will constantly contact with said rail 205, and lever 202 will be reciprocated therewith.

The depending arm 208 of the lever 202 is operably associated with the pull bar bail 153 (Fig. 6) so that the reciprocative motion of bail 153 will cause the oscillation of the lever 202 about pivot 203, whether the platen frame 82 is in the shift or the unshift position. Thus, when the bail 153 is in its normal position (the leftward position as shown in Fig. 6), the lever 202 will hold the inking ribbon, through the instrumentality of the ribbon guide (not shown) located at the upper extremity of member 199 (Fig. 10), in its downward position to effect visibility of the printed character. When the bail 153 moves rightwardly for a printing operation, the ribbon will be raised to printing position due to the counterclockwise movement imparted to the lever 202 by the bail 153. When the platen frame 82 is in the position shown in Fig. 10, which is the lower case printing position, the shield 195, upon oscillation of lever 202, will not be raised sufficiently to be interposed between the type face 197 and the platen 173. However, when the platen frame 82 is in the upper case printing position with the platen 173 in printing relation with the upper case type face 196, the shield 195 will, upon reciprocation, be raised so as to become interposed between the lower case type face 197 and the record material, thus preventing any ink which has accumulated on the type face 197 from smudging the record material.

As illustrated in Figs. 10, 11 and 12, there is provided a platen rotator for automatically changing the printing point of the platen 173 in response to each carriage return operation. As previously described, the platen 173 spaces with the type carriage 142, and accordingly is spaced step by step for character spacing and, upon reaching the end of the line, the platen 173 is returned rapidly with the carriage 142 to the beginning-of-line position. In contact with the platen 173 at a point opposite to the printing point is a closely wound coiled spring 200 which is connected at its ends to the side frame members of the platen supporting frame 82, in such a manner that the platen 173 is caused to rotate as it advances during character spacing. Moreover, upon the rapid return movement of the platen 173 (under the influence of the carriage return spring 150) during the performance of the carriage return function, the platen 173 will, owing to the combined sliding and rolling relation with the yieldable spring member 200, rotate incommensurately, thus causing the same printing point of the platen to be presented to the type bars a minimum number of times. In other words, through the instrumentality of the platen rotator 200, the platen 173 is controlled in such manner as to reduce to a minimum the number of times any particular printing point on the platen is impinged upon, thereby reducing to a minimum the wear at any given point and hence prolonging the life of the platen. In lieu of the coiled spring 200, a taut wire or cord can, of course, be used.

In accordance with the present invention, the printing apparatus used in combination with the projection system is of such structure and arrangement that it is not affected by change in physical position of the assembly as a whole with respect to gravity. Specifically, a counterweight is provided which is associated with the movable type carriage 142 so as to render the movement of the type carriage 142 independent of the force of gravity, and to assist the carriage return spring in uniformly moving the type carriage in any physical position of the printer.

As previously described, the type carriage 142 is movably supported on tracks 145 and 146, and after being operated upon by the spacing mechanism, the carriage 142 is returnable to the beginning-of-line position by the carriage return spring mechanism 150. Having reference to Fig. 8, the type carriage 142 has secured thereto a bar 209 to the center of which is secured a stud 211 on which is pivoted a bar 212. A strap 213 is secured to end 214 of bar 212, and extends around an idler roller 215 and is secured at 216 to a counterweight 217. Roller 215 is rotatably supported on a bar 218 suitably positioned in the frame 15. Secured to end 219 of bar 212 is a strap 221 which extends around an idler roller 222 and is fastened at 223 to the counterweight 217. Idler roller 222 is rotatably mounted on the bar 218. Counterweight 217 is provided with rollers 224 and 225 (Fig. 9) which roll on upper rail 226, and rollers 227 and 228 which roll on lower rail 229. Rails 226 and 229 are appropriately supported in the frame 15. Secured at 231 to the counterweight 217 is a strap 232 of a spring return mechanism 233 comparable to the carriage return spring mechanism 150. The spring return mechanism 233 is mounted on a bracket 234 secured to the frame 15.

As the carriage 142 advances step by step in response to the spacing mechanism, the carriage return spring mechanism 150 is wound up and energy is stored therein in readiness to return the carriage. At the same time, the carriage return mechanism 233 is also wound up to store energy therein, so that when the carriage return signal is received by the printer the carriage is freed in the manner described in the aforementioned Patent 1,904,164, and the carriage return operation is effected through the release of the energy stored up in the return mechanisms 150 and 233. In the embodiment shown in Figs. 8 and 9, the return of the carriage 142 and the counterweight 217 is illustrated as effected by two return mechanisms, the return mechanism 150 acting directly upon the type carriage 142 and the return mechanism 233 acting directly upon the counterweight 217. The two return mechanisms co-operate to facilitate the return of both devices. If desired, a single return mechanism may be employed by providing a return spring mechanism of sufficient strength to return both devices. In this event, the spring return mechanism may be located either at the position shown by the return mechanism 150 or by the return mechanism 233. The carriage return mechanism 150 is provided with a dashpot buffer mechanism as is shown and described in the aforementioned Patent 1,904,164.

The counterweight return mechanism is similarly provided with a buffer mechanism. This buffer mechanism comprises a dashpot 235 suitably mounted in the plate 236 secured to frame 15. Pivotally supported at 237 on bracket 240 and properly positioned with respect to buffer 235 is a buffer lever 238. The rounded end of lever 238 fits into a notched portion of the plunger 239 of the buffer 235 (Fig. 18). End 241 of the plunger 239 is adapted to receive the blow from the counterweight 217, said end 241 being receivable in the counterbore 242 in the counterweight 237. The counterbore 242 is indicated in the present embodiment for structural purposes only and is not an essential element of the structure. The resistance of pneumatic buffer 235 is varied by means of adjustable ports, in a well-known manner. A spring 243 tends to rotate lever 238 in a counterclockwise direction (Figs. 8 and 9) about pivot 237 to restore the buffer mechanism to its operative position.

Figure 15:
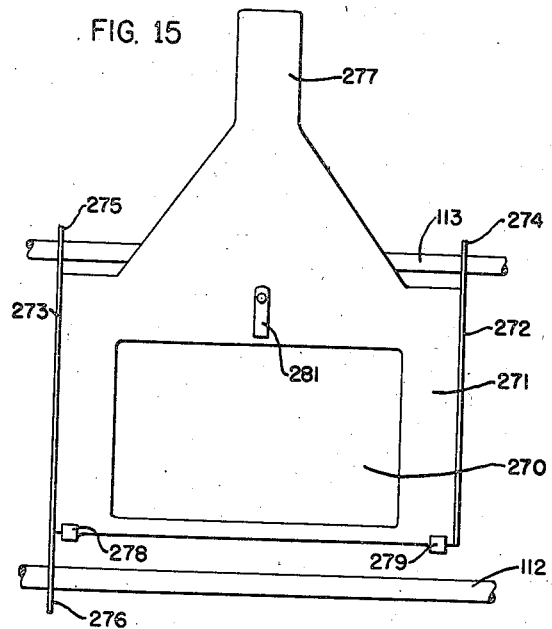
Fig. 15 is an elevational view of the stereopticon slide carrier of the present invention.
Figure 16:
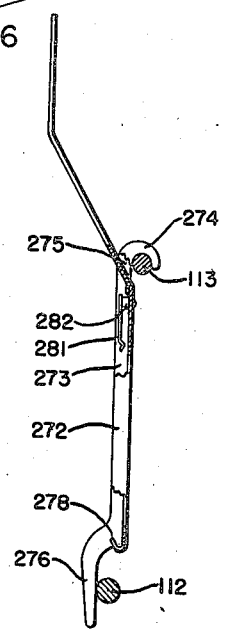
Fig. 16 is a side view, partly in section, of the slide carrier shown in Fig. 15.

The present invention also contemplates the projection of predetermined message matter or other information of a fixed nature by providing a stereopticon slide, as illustrated in Figs. 15 and 16, which is readily insertable into the field of projection. The stereopticon frame 271 comprises a plate having integral flanges 272 and 273, which are conformed at their upper ends with hook portions 274 and 275, respectively, which embrace guide rod 113. Flange 273 is provided at its lower end with an extension 276 which bears against guide rod 112 (Fig. 16), thereby serving to steady the frame 271 against oscillation and simultaneously to hold the frame 271 in the proper vertical plane coincident with the field of projection. Frame 271 is readily insertable in the projector by means of the handle portion 277 (as shown in Figs. 15 and 16, for example). Frame 271 is also provided with an aperture 270 of a size determined by the area of the projection field, so that a stereopticon slide of suitable dimensions may be placed thereover. The means for supporting and holding the stereopticon slide comprises a pair of flanges 278 and 279 integral with the frame 271 at the bottom edge thereof, and a retainer comprising a spring clip 281 pivotally secured to the frame 271 and properly spaced therefrom by a spacer 282. Thus, to insert a stereopticon slide, the spring clip 281 is swung around its pivot to its horizontal position, and the slide is mounted on the flanges 278 and 279; and after pressing the slide lightly against the frame 271, the spring clip 281 is again swung back to the position shown in Figs. 15 and 16, thereby serving to retain the slide in place.

It is understood that the features of the present invention are not to be limited to the specific forms described herein, but embrace all forms which come within the scope of equivalency of the appended claims.

What is claimed is:

1. In combination, a printing device having a carriage movable to form character spaces, means for directing record material through said device comprising means for guiding said material in a vertical plane above and adjacent to said carriage, means comprising a projection system for projecting onto a screen images of the characters produced on said record material, means for case shifting said guiding means, and means comprising positive stop elements and overcentering means operable therebetween to accelerate shifting movement of said guiding means independently of said case shifting means to minimize the optical effect of said shifting movement upon the image.

2. In combination, a printing device having a carriage movable to form character spaces, means for drawing record material through said device comprising a pulling device disposed beyond the exit end of a vertical projection field located immediately above the printing point and an intermittently operable delivery means positioned in advance of said projection field, means comprising a projection system for projecting onto a screen images of the characters produced on said record material in said projection field, means positioned between said pulling device and said delivery means for shifting said record material for recording upper and lower case characters thereon, and overcentering means to accelerate shifting movement of said shifting means to minimize the optical effect of said shifting movement upon the image.

3. In combination, a printing device having a type carriage movable to form character spaces and a platen movable with said carriage, means for drawing a web through said device comprising a pulling device disposed beyond the exit end of a vertical projection field located immediately above and including said platen and delivery means positioned in advance of said platen, means comprising a projection system for projecting onto a screen images of the characters produced on said web, means for case shifting the web in said projection field, and overcentering means effective to accelerate shifting movement of said web to minimize the optical effect of said shifting means upon the image.

4. In combination, a printing device, means for drawing a web through said device comprising a pulling device disposed beyond the exit end of a vertical projection field located immediately above and including the printing point and delivery means positioned in advance of said projection field, means comprising a projection system for projecting onto a screen images of the characters produced on said web in said projection field, means positioned between said pulling device and said delivery means for shifting said web for recording upper and lower case characters thereon, and overcentering means to accelerate shifting movement of said shifting means to minimize the optical effect of said shifting movement upon the image.

5. In a projection system, a framework, a lamp housing and condensing lens system supported on said framework, a telegraph receiver mounted in said framework in co-operative relationship with said lamp housing and lens system, a web directing means so arranged with respect to said receiver and lens system as to provide a vertical projection field, recording means in said receiver for producing lines of printing on said web in said projection field, means for case shifting said web in said projection field to facilitate recordation of upper and lower case characters thereon, means for moving said web so as to direct said lines of printing upwardly across said projection field, mirrors and an objective lens co-operating with each other so as to produce upon a screen an image moving thereacross in correspondence with the movement of the web through said projection field, and overcentering means effective independently after a predetermined initial operation of said case shifting means to accelerate shifting movement of said web in said projection field to minimize the optical effect of said shifting movement upon the image.

6. In a projection system, a framework, a lamp housing and condensing lens system supported on said framework, a telegraph receiver mounted in said framework in cooperative relationship with said lamp housing and lens system, a web directing means so arranged with respect to said receiver and lens system as to provide a vertical projection field, recording means responsive to code signals including a type carriage and a platen movable therewith to produce lines of printing on said web in said projection field, platen shift means, means having a slotted articulation with said shift means, means for moving said web so as to direct said lines of printing upwardly across said projection field, mirrors and an objective lens mutually co-operative so as to produce upon a screen an image moving thereacross in correspondence with the movement of the web through said projection field, and overcentering means effective through the instrumentality of said articulation to urge said field to its shifted position independently of said platen shifting means.

7. In combination, a printing device having a carriage movable to form character spaces, a platen movable with said carriage, platen shifting means, means for directing record material through said device comprising means for guiding said material in a vertical projection field above and adjacent to said carriage and in cooperative relation with said platen, means comprising a projection system for projecting onto a screen images of the characters produced on said record material, means for case shifting said guiding means, and overcentering means effective after a predetermined initial movement of said platen shifting means to urge said record material to its shifted position independently of said platen shifting means.

8. In combination, a printing device having a carriage movable to form character spaces, means for directing record material through said device comprising means for guiding said material in a vertical plane above and adjacent to said carriage, means comprising a projection system for projecting onto a screen images of the characters produced on said record material, means for case shifting said guiding means, and overcentering means to accelerate shifting movement of said guiding means to minimize the optical effect of said shifting movement upon the image.

WALTER J. ZENNER.